United States Patent [19]

Bowman et al.

[11] Patent Number: 4,934,572
[45] Date of Patent: Jun. 19, 1990

[54] LOCKABLE CLAMPING APPARATUS

[75] Inventors: Ronald L. Bowman, 18242 W. 3rd, Golden, Colo. 80401; L. Dean Northey, 736 S. Emerson, Denver, Colo. 80209

[73] Assignees: Ronald L. Bowman, Golden; L. Dean Northey, Aurora; Thomas R. Tennessen, Boulder, all of Colo.

[21] Appl. No.: 242,362

[22] Filed: Sep. 9, 1988

[51] Int. Cl.$^5$ .............................................. B60R 9/00
[52] U.S. Cl. .................... 224/42.45 R; 224/42.03 B; 224/42.32; 410/3; 248/540; 211/5; 211/17
[58] Field of Search ................ 224/42.03 B, 315, 324, 224/42.32, 42.38, 42.45 R, 319; 24/494, 513, 486; 70/233, 234, 235, 19, 30, 49, 62; 211/17, 18, 22, 5, 8; 248/540; 410/3, 110

[56] References Cited

U.S. PATENT DOCUMENTS

| | | | |
|---|---|---|---|
| 1,223,258 | 4/1917 | Cooper | 224/42.38 |
| 1,442,745 | 1/1923 | Timbercake | 211/8 |
| 1,707,266 | 4/1929 | Hillborn | 70/19 |
| 2,447,199 | 8/1948 | Miller | 24/494 |
| 2,961,209 | 11/1960 | Willey | 248/540 |
| 3,656,670 | 4/1972 | Hill | 224/42.03 B |

FOREIGN PATENT DOCUMENTS 3034750  4/1982  Fed. Rep. of Germany ...... 224/319

OTHER PUBLICATIONS 1988 sales brochure by Yakima Company of Arcata, California.
Hollywood Engineering 1988 sales brochure for its Model T900 Bicycle Carrier.
Advertisement in the Mid-Summer 1988 edition of Performance Bicycle Shop.
Sales brochure published in 1988 by the Cycle Cinch Company of El Cajon, California.
Article written by Fred Zahradnik in the Jun., 1988 edition of Bicycling Magazine.

Primary Examiner—Linda J. Sholl
Attorney, Agent, or Firm—Brian D. Smith

[57] ABSTRACT

Disclosed is a lockable clamping apparatus for securing a bicycle to the rail of a pick-up truck bed having a generally L-shaped lengthwise extending portion. The clamping apparatus includes outer clamping means for engaging the outer facing surfaces of the truck bed rail's L-shaped portion and inner clamping means for engaging the inner facing surfaces of the truck bed rail's L-shaped portion. The inner and outer clamping means are movably, preferably pivotally, connected to each other so that they can be moved, preferably pivoted, between an open mounting position and a closed clamping position. The clamping apparatus is mounted on the truck bed rail when it is in its open mounting position. When the clamping apparatus is in its closed clamping position, the first and second clamping means tightly engage the L-shaped portion of the truck bed rail to secure the clamping apparatus thereto. The clamping apparatus also includes lock facilitating means for enabling the inner and outer clamping means to be locked together in the closed clamping position. In addition, the clamping apparatus includes skewer mounting means for receiving a bicycle skewer to secure a bicycle to the apparatus.

20 Claims, 2 Drawing Sheets

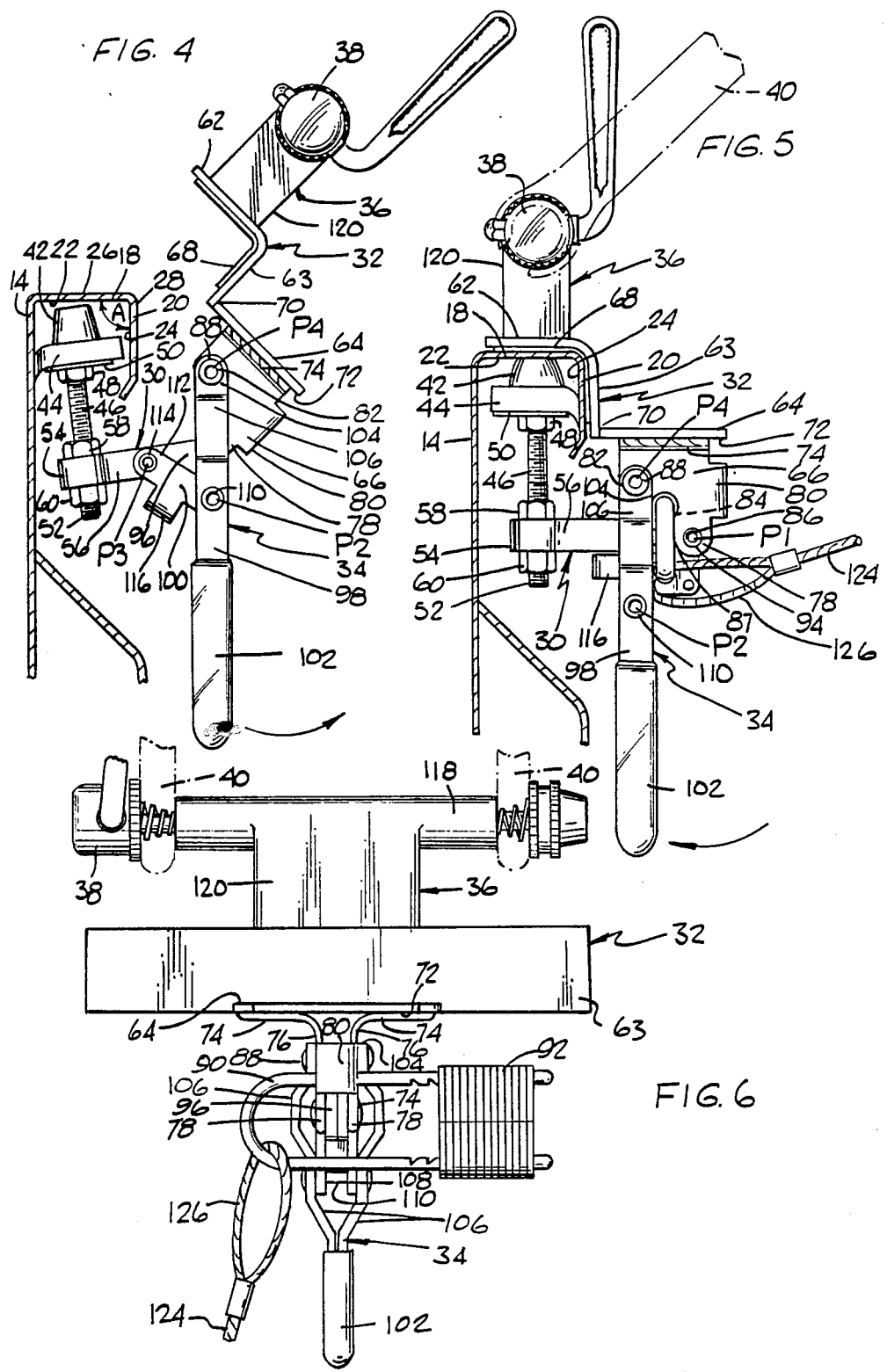

LOCKABLE CLAMPING APPARATUS

TECHNICAL FIELD

The invention relates generally to apparatus for securing bicycles to motor vehicles and, more particularly to, apparatus for securing bicycles to the bed of a pick-up truck.

BACKGROUND ART

While bicycling has been popular for many years in the United States and throughout the world, it has recently enjoyed an increase in popularity, particularly among young adults. Unfortunately, many of these young adults live in crowded urban and suburban communities where it is often difficult and sometimes dangerous to ride a bicycle. As a result, these adults are often forced to transport their bicycles in an automobile or pick-up truck in order to get to a suitable place for riding.

To make the transportation of such bicycles easier, many systems have been developed for securing a bicycle to an automobile. Systems have also been developed for securing bicycles to the bed of a pickup truck. However, the systems developed, thus far, for pick-ups have many drawbacks. For example, the pick-up truck bicycle rack advertised by the Yakima Company of Arcata, Calif. in Yakima's 1988 sales brochure is unnecessarily complex in that it employs a rack which extends across the entire bed of the pick-up truck. The Yakima system also employs two "L" brackets to secure the ends of the rack to the rail of the truck bed. It also appears from Yakima's brochure that permanent holes must be drilled in the truck bed in order to secure the "L" brackets to the truck bed's rail.

Hollywood Engineering in its 1988 sales brochure for its model T900 Bicycle Carrier discloses a pick-up truck bicycle rack which is similar to the Yakima system in that it also utilizes a rack which extends across the bed of the truck. The Hollywood system is an improvement, however, over the Yakima system in that it employs a clamping system for securing the rack to the bed of the truck which does not require the drilling of any holes in the truck bed, sidewall or rail. A major drawback, however, to the Hollywood system is that it appears that it can be rather quickly disassembled with an allen wrench, thereby enabling a thief to quickly steal any bicycles secured thereby.

Another bicycle rack system for trucks which utilizes a rack that extends across the truck bed is advertised in the Mid-Summer 1988 edition of Performance Bicycle Shop. This rack employs two telescoping sections which are held in place against the truck bed's sidewalls by tension. The tension is created by threadably extending the telescoping sections until their respective ends firmly rest up against the truck bed's sidewalls, much like a shower curtain rod rests up against the walls of a shower stall. This telescoping rack system appears to be quite easy to install and, according to the advertisement, does not mar the truck's paint finish. It is not, however, lockable and testing of the system has revealed that it pushes the sidewalls of most truck beds apart.

Another system for securing a bicycle to a pick-up truck bed is disclosed in a sales brochure published in 1988 by the Cycle Cinch Company of El Cajon, Calif. This system is quite simple in that it consists entirely of a bracket with holes provided in it for receiving a bicycle skewer. In addition, a bicycle can be locked to the bracket with a commercially available cable and padlock system. A major drawback to this system, however, is that bolt holes must be drilled in the truck bed to secure the bracket to the truck bed.

Yet another system for securing a bicycle to the bed of a truck is disclosed in an article written by Fred Zahradnik in the June, 1988 edition of Bicycling Magazine. This system utilizes a clamp which clamps to the outside surface of a truck bed rail. The system, however, as disclosed is not lockable. Moreover, it appears from the photograph in the article that the clamp could be easily pulled off the truck bed rail even if it were provided with a lock. This system is available from the Marne/Truck Rack Company of Pasadena, Calif.

While all of the aforementioned systems undoubtedly secure a bicycle to the bed of pick-up truck, a need still exists for a system which is inexpensive, lockable and which can be quickly secured to a truck bed without marring the truck bed's finish and without having to drill any holes in the truck bed's sidewalls or rail.

DISCLOSURE OF THE INVENTION

The present invention solves the aforementioned problems of securing a bicycle to the bed of a pick-up truck by providing a lockable clamping apparatus for attachment to the rail of any pick-up truck bed having a generally L-shaped lengthwise extending portion. The clamping apparatus includes outer clamping means having a first clamping portion for engaging the outer facing surfaces of the L-shaped portion of the truck bed rail and inner clamping means having a second clamping portion for engaging the inner facing surfaces of the L-shaped portion. The inner and outer clamping means are movably connected to each other, preferably pivotally connected to each other, so that they can be moved, preferably pivoted, between an open mounting position and a closed clamping position. The first and second clamping portions are spaced from one another when the inner and outer clamping means are in the open mounting position. When in the closed clamping position, the first and second clamping portions tightly engage the L-shaped portion of the truck bed rail to secure the clamping apparatus thereto. The clamping apparatus also includes a lock facilitating means for enabling the inner and outer clamping means to be locked together in the closed clamping position. In addition, the clamping apparatus includes skewer mounting means for receiving a bicycle skewer to secure a pair of bicycle forks and the like to the clamping apparatus. In the preferred embodiment of the invention, the skewer mounting means is rigidly attached to the outer clamping means of the clamping apparatus.

The preferred embodiment of the present invention also includes adjusting means for adjusting the closed clamping position of the first and second clamping portions relative to each other so that the clamping apparatus can accommodate a variety of differently sized L-shaped portions of truck rails.

In addition, the preferred embodiment of the present invention includes a padlock and cable for cooperation with the lock facilitating means of the apparatus to lockingly secure a bicycle to the clamping apparatus.

The preferred embodiment of the present invention further includes pivoting handle means for pivotally moving the inner and outer clamping means about a first pivot point so that the clamping means can be pivoted between the open mounting position and the closed clamping position.

BRIEF DESCRIPTION OF THE DRAWINGS

The invention will be more readily understood by reference to the accompanying drawings wherein like reference numerals indicate like elements throughout the drawing figures and in which:

FIG. 4 is a side view illustrating the lockable clamping apparatus of FIG. 1 as it would appear when being mounted on the rail of a pick-up truck bed with the clamping apparatus in its open mounting position.

FIG. 5 is a side view similar to FIG. 4 showing the clamping apparatus in its closed clamping position wherein the clamping apparatus is tightly engaging the L-shaped portion of the truck bed rail.

FIG. 6 is a rear view of the clamping apparatus of FIG. 1 showing the clamping apparatus as it would appear from the inside of a pick-up truck bed when it is locked with a padlock to the truck bed rail.

BEST MODE FOR CARRYING OUT THE INVENTION

Figure 1:
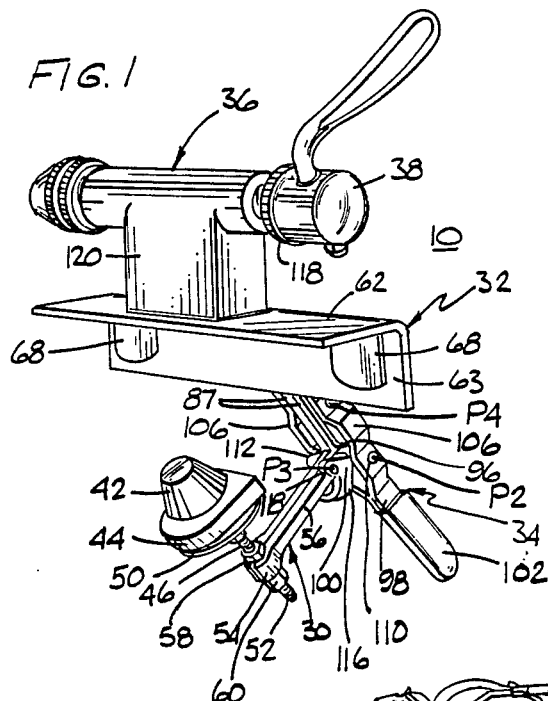
FIG. 1 is a perspective view of the preferred embodiment of a lockable clamping apparatus for securing a bicycle to the bed of a pick-up truck.

FIGS. 1 through 6 illustrate a lockable clamping apparatus 10 of the present invention for securing a bicycle 12 (see FIG. 2) to an inwardly turned rail 14 of a pick-up truck bed 16. Rail 14, as best illustrated in FIGS. 4 and 5, is generally channel-shaped and, as such, has a generally longitudinally extending L-shaped portion or member (not numbered) which consists essentially of a base section 18 and a side section 20. Side section 20 projects outwardly (or downwardly as illustrated in FIGS. 4 and 5) from the edge of base section 18 at a right angle A. The surfaces of base and side sections 18 and 20 which form right angle A and which face inwardly are identified and referred to herein as inner facing rail surfaces 22 and 24, respectively. The surfaces on the other side of base and side sections 18, 20 which face outwardly are identified and referred to herein as outer facing rail surfaces 26 and 28, respectively. While angle A as illustrated herein is essentially a right angle, it could in accordance with the present invention range anywhere from between about 45° to about 135°. In addition, while rail 14 as illustrated herein is inwardly turned (i.e., projecting into the interior of the truck bed) it could be turned outwardly away from the truck bed interior.

Turning now to lockable clamping apparatus 10, FIGS. 1, 4 and 5 illustrate that apparatus 10 generally includes an inner clamping means or clamping half 30, an outer clamping means or clamping half 32, a pivoting handle means 34 and a skewer mounting means or tower 36 for receiving a bicycle skewer 38 to secure the front forks 40 of bicycle 12 to clamping apparatus 10.

Inner clamping half 30 consists essentially of a first clamping portion (not numbered) and an adjusting means (also not numbered). The first clamping portion (also referred to herein as the resilient gripping means) includes a first gripping portion 42 for tightly engaging rail surface 22 and a second gripping portion 44 for tightly engaging rail surface 24 as such is depicted in FIG. 5. Gripping portions 42 and 44 are tightly secured together and mounted on a first end (not numbered) of a threaded bolt 46 by providing each gripping portion with a threaded bore (not numbered) for receiving bolt 46 and by threading each gripping portion onto the first end of bolt 46. The gripping portions are then tightly secured together on the end of bolt 46 by tightening a nut 48 up against a washer 50 which rests up against the underside surface of gripping portion 44.

The other (i.e., a second end 52) of threaded bolt 46 (also referred to herein as the adjusting means) is attached to a first end 54 of a support arm 56 by threading it into a threaded bore (not numbered) which is provided in first end 54.

Turning now to outer clamp half 32, FIGS. 1 and 4 illustrate that outer clamping half 32 includes an L-shaped clamping portion (not numbered) having first and second sides 62 and 63, respectively, a support plate 64 and a depending support bracket 66. Sides 62, 63 are shaped (right angled as illustrated) to complement the shape of outer rail surfaces 26 and 28 so that sides 62, 63 are capable of tight engagement therewith. The inner surfaces of sides 62, 63 are also, as illustrated, provided with protective pads 68 (preferably made of a resilient material) to prevent marring of rail surfaces 26 and 28.

Support plate 64 is rigidly attached, preferably welded, to an edge 70 of side 63 so that it projects outwardly therefrom, preferably at a right angle. Support plate 64 is also rigidly attached, again preferably welded, on its underside surface 72 to a first end 74 of depending support bracket 66.

Depending support bracket 66 includes two generally triangularly shaped, spaced parallel side plate portions 76 which extend downwardly from first end 74 to a second end 78 of bracket 66. Depending support bracket 66 also includes a U-shaped portion 80 which connects side portions 76 together along one side thereof. In addition, side plate portions 76 define three pairs of axially aligned bores 82, 84 and 86 which are located along a side 87 of plates 76.

Axially aligned bores 82 are selectively located near first end 74 and are sized to receive a pivot pin 88 for purposes explained in more detail below.

Axially aligned bores 84 are also selectively positioned along side 87 and are sized to receive a U-shaped portion 90 of a padlock 92 (see FIG. 6) to lock inner and outer clamping halves 30, 32 together, which is also explained in more detail below.

Axially aligned bores 86 are located at second end 78 of support bracket 66 and are sized to receive a pivot pin 94. Pivot pin 94 pivotally connects depending support bracket 66 to a second end 96 of support arm 56. This pivotal connection (which is identified and referred to herein as first pivot point P1) enables inner clamping half 30 and outer clamping half 32 to be pivotally moved relative to each other about pivot point P1.

Pivotal movement of clamping halves 30, 32 about pivot point P1 is assisted, in accordance with the present invention, by pivoting handle means 34. Handle means 34 includes a generally longitudinally extending longer section 98 and a generally longitudinally extending shorter section 100. Longer section 98 has a handle 102 at one end (not numbered) and a forked section (not numbered) which extends from the handle to the longer section's other end 104. The forked section includes two corresponding projections 106 which define a jaw (not numbered) therebetween.

Shorter section 100 has a first end 108 which is located within the jaw of the forked section and which is pivotally attached to a central section of projections 106 by a pin 110. This pivotal connection enables the shorter and longer sections to pivot relative to each other about a second pivot point P2.

Shorter section 100 also has a second end 112 which is pivotally attached by a pin 114 to a central section of support arm 56 which is located between first and second ends 54 and 96 of support arm 56. This pivotal connection enables shorter section 100 and support arm 56 to pivot relative to each other about a third pivot point P3.

In addition, shorter section 100 has a stop 116 for preventing further movement of inner and outer clamping halves 30, 32 when stop 116 contacts support arm 56.

Referring now to longer section 98, it can be seen in the figures that ends 104 of projections 106 are pivotally connected to aligned bores 82 of support bracket 66 by pivot pin 88. This pivotal connection allows for pivotal movement between longer section 98 and depending support bracket 66 about a fourth pivot point P4.

Those skilled in the relevant art will appreciate that the pivotal movement provided by pivoting handle means 34 about pivot points P2 through P4 facilitates the pivotal movement of clamping halves 30, 32 about pivot point P1. It also significantly enhances clamping leverage so that the first and second clamping portions are capable of tightly gripping (i.e., almost squeeze) rail 14. Further discussion herein of the mechanics which occurs at pivot points P2 through P4 is not necessary inasmuch as it forms no part of the present invention. In fact, a pivoting assembly which includes depending support bracket 66, support arm 56 and longer and shorter sections 98 and 100, respectively, is commercially available from the Travers Tool Company of Flushing, N.Y. and referred to as Toggle Clamp Model No. TGC-300.

Turning now to skewer mounting means or tower 36, it can be seen in the figures that tower 36 includes a top tubular-shaped portion 118 defining a bore (not numbered) for receiving skewer 38. Tower 36 also includes a spacer portion 120 which is welded to side 62 of outer clamp half 32. Spacer 120 serves to space tubular portion 118 from side 62 to facilitate easy insertion and removal of skewer 38 from the bore defined by top portion 118. While, as illustrated, tower 38 is attached to side 62, it could in accordance with the present invention be attached to any portion of apparatus 10.

In using apparatus 10 to secure and lock bicycle 12 to rail 14 of pick-up truck bed 16, one first moves apparatus 10 to its open mounting position which is illustrated in FIGS. 1 and 4. This is done most easily by holding tower 36 in one hand and pulling outwardly on handle 102 with the other hand in the direction of the arrow indicated in FIG. 4.

One then mounts apparatus 10 on rail 14 by inserting gripping portions 42, 44 into the channel defined by the rail, as such is illustrated in FIG. 4.

Apparatus 10 is then moved to the closed clamping position illustrated in FIG. 5. This is most easily done by positioning sides 62, 63 up against outer rail surfaces 26 and 28, respectively, (as such is illustrated in FIG. 5) and then pushing inwardly on handle 102 until further inward movement of the handle is prevented by contact of stop 116 against the underside surface of support arm 56.

As clamping halves 30, 32 move from the open to the closed clamping positions, gripping portions 42, 44 move from their positions illustrated in FIG. 4 to their positions illustrated in FIG. 5 wherein they are tightly engaging or gripping rail surfaces 22, 24 respectively.

It should be noted that gripping portion 42 is shown in FIG. 4 as contacting the back surface (not numbered) of rail 14. This contact occurs as the gripping portions are being moved from the open to the closed clamping position. While this contact is illustrated in FIG. 4, it is not necessary to the present invention and whether or not it occurs is strictly a function of the rail's width.

It should also be noted that in attempting to clamp clamping apparatus 10 to rail 14, one may find after moving the apparatus to its closed clamping position, that gripping portions 42, 44 are not tightly engaging or gripping rail surfaces 22, 24. One might also find that it is not even possible to move the apparatus to its closed clamping position (i.e., one may not be able to move handle 102 to the point where stop 116 rests up against the underside surface of support arm 56). If either of these conditions occurs clamping apparatus 10 will require adjustment. However, such adjustment is easily provided in accordance with the present invention by simply untightening bolts 58, 60 and then threading bolt 46 within the bore of support arm 56 until the bolt reaches a position within the bore which provides the desired tight engagement between gripping portions 42, 44 and inner rail surfaces 22, 24. Bolts 58 and 60 are then simply retightened up against their respective surfaces of support arm 56 to secure bolt 46 in the desired position. Readjustment of the bolt should not be necessary as long as the clamping apparatus is used on the same rail or a similarly sized rail.

After tightly securing clamping apparatus to rail 14, forks 40 of bicycle 12 are secured to tower 36 by simply locating the ends of the forks over the exposed ends of skewer 36 and tightening skewer 36.

Figure 2:
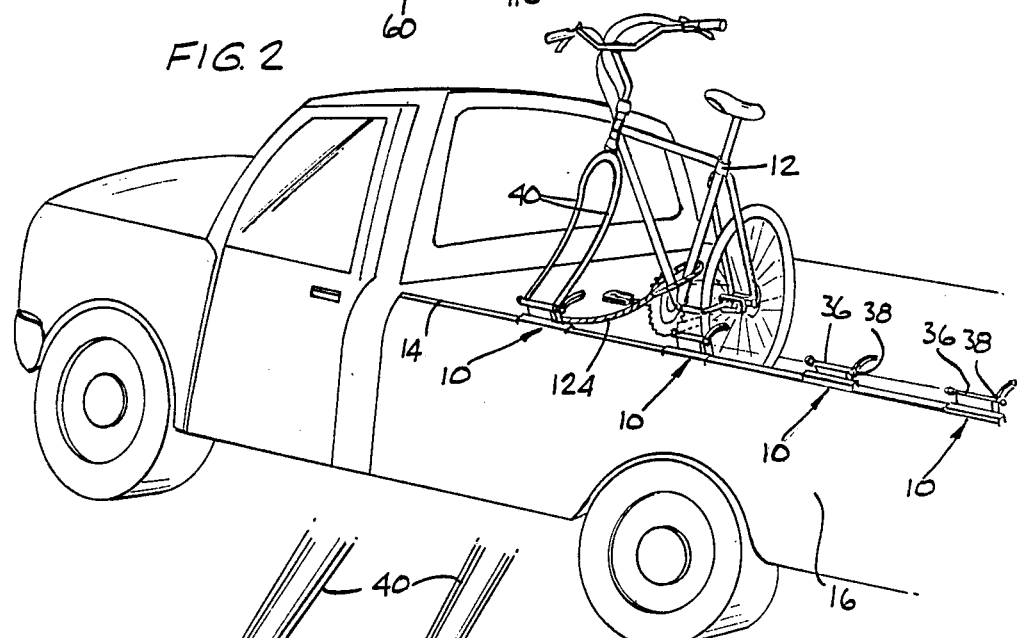
FIG. 2 is a perspective view showing the clamping apparatus of FIG. 1 securing the front forks of a bicycle to the bed of a pick-up truck.
Figure 3:
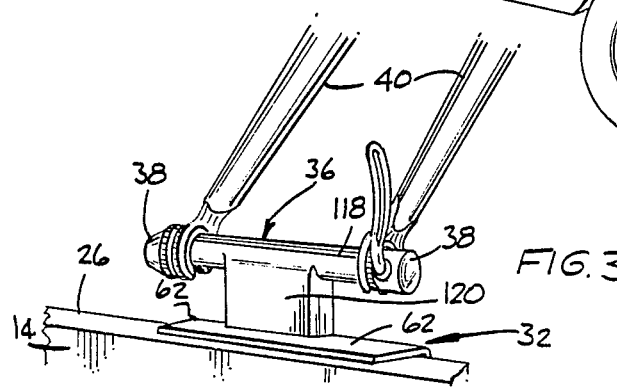
FIG. 3 is an enlarged perspective view showing the forks of the bicycle depicted in FIG. 2 secured to the clamping apparatus which, in turn, is secured to the rail of a pick-up truck bed.

Bicycle 12 can then, if desired, be locked to rail 14 with padlock 92 and a conventional security cable 124 having looped ends 126. To do this, cable 124 is passed through the bicycle's frame and looped through one of the cable's looped ends 126, as such is illustrated in FIG. 2. U-shaped portion 90 of padlock 92 is then passed through the cable's other looped end 126. The U-shaped portion is then passed through bore 84 of support bracket 66 and locked to the base portion (not numbered) of padlock 92, as such is illustrated in FIG. 6.

Bicycle 10 is now locked to rail 14. Moreover, it cannot be removed from rail 14 by simply moving apparatus 10 to its open mounting position because the insertion of U-shaped portion 90 in bore 84 prevents such. U-shaped portion 90 prevents such movement because, by being located in bore 84, it is positioned up against an edge of longer section 98. This prevents longer section 98 from being pivoted about pivot point P4 which, in turn, prevents clamping halves 30, 32 from being pivoted about pivot point P1 to the open mounting position. Accordingly, apparatus 10 cannot be removed from rail 14.

Those skilled in the relevant art will also appreciate that apparatus 10 cannot be removed from rail 14 (once it is locked thereto) even by attempting to loosen bolt 46. This is because bolt 46 cannot be loosened once it is locked in the closed clamping position. The tight gripping engagement of gripping portions 42, 44 against rail surfaces 22, 24 and the square shape of gripping portion 44 serve to prevent loosening of bolt 46.

From the foregoing description, those skilled in the relevant art will appreciate that the present invention easily and inexpensively solves all of the previously discussed problems associated with the aforementioned bicycle rack systems for pick-up trucks. The present invention is certainly much less expensive than those systems utilizing a rack which extends across the truck bed. The present invention is also lockable. In addition, with the present invention there is no need to drill any holes through either the truck bed or the truck bed's rail. The present invention is also easily mounted and clamped to a truck bed's rail. It can also be quickly removed from the rail, if such is desired. Moreover, unlike some of the other systems, the present invention will not mar the finish of the truck bed or the truck bed rail.

While the above invention has been shown and described in detail herein, it should be understood that this invention is not to be limited to the exact form disclosed and changes in detail and construction of the invention may be made without departing from the spirit thereof.

What is claimed:

1. A lockable clamping apparatus for attachment to a generally L-shaped lengthwise extending member having inner and outer facing surfaces, said apparatus comprising:
   inner clamping means having a first clamping portion for engaging the inner facing surfaces of the L-shaped member;
   outer clamping means having a second clamping portion for engaging the outer facing surfaces of the L-shaped member, said inner and outer clamp means being movable connected to each other so that they can be moved between an open mounting position and a closed clamping position, said first and second clamping portions being spaced from one another when said inner and outer clamping means are in the open mounting position to enable said apparatus to be mounted on the L-shaped member, said first and second clamping portions tightly engaging said L-shaped member to clamp said apparatus to the L-shaped member when said inner and outer clamping means are in the closed clamping position;
   lock facilitating means for enabling said inner and outer clamping means to be locked together in the closed clamping position; and
   skewer mounting means for receiving a bicycle skewer to secure a pair of bicycle forks and the like to said clamping apparatus.

2. A lockable clamping apparatus as claimed in claim 1 wherein said lock facilitating means includes a bore provided in said outer clamping means for receiving a padlock to lock said inner and outer clamping means together in the closed clamping position.

3. A lockable clamping apparatus as claimed in claim 1 further comprising:
   adjusting means for adjusting the closed clamping position of said first clamping portion relative to said second clamping portion so that said apparatus is capable of tightly engaging a variety of differently sized L-shaped members.

4. A lockable clamping apparatus for attachment to a generally L-shaped lengthwise extending member having a base section and a side section projecting outwardly from an edge of the base section, each base and side section defining inner and outer facing surfaces, said apparatus comprising:
   an inner clamping half having a first clamping portion for engaging the inner facing surfaces of the base and side sections of the L-shaped member;
   an outer clamping half having a second clamping portion for engaging the inner facing surfaces of the base and side sections of the L-shaped member, said inner and outer clamping halves being pivotally connected to each other so that they can be pivotally moved relative to each other about a first pivot point between an open mounting position and a closed clamping position, said first and second clamping portions being spaced from each other when said inner and outer clamping halves are in the open mounting position so that said apparatus can be mounted on the L-shaped member, said first and second clamping portions tightly engaging said L-shaped member when said inner and outer clamping halves are in the closed clamping position to clamp said apparatus to the L-shaped member;
   lock facilitating means for enabling said inner and outer clamping halves to be locked together in the closed clamping position; and
   skewer mounting means for receiving a bicycle skewer to secure a pair of bicycle forks to said clamping apparatus.

5. A lockable clamping apparatus as claimed in claim 4 further comprising:
   adjusting means for adjusting the closed clamping position of said first clamping portion relative to said second clamping portion so that said apparatus can tightly engage a variety of differently sized L-shaped members.

6. A lockable clamping apparatus as claimed in claim 4 wherein said second clamping portion includes protective pads for preventing said second clamping portion from marring the outer facing surfaces of the L-shaped member.

7. A lockable clamping apparatus as claimed in claim 4 further comprising a lock for cooperating with said lock facilitating means to lock said inner and outer clamping halves together are in the closed clamping position.

8. A lockable clamping apparatus as claimed in claim 7 wherein said lock includes means for securing a cable so that the cable can be passed through the frame of a bicycle to lockingly secure the bicycle to the lock, thereby enabling the bicycle to be lockingly secured to the L-shaped member when said lock is cooperating with said lock facilitating means to lock said inner and outer clamping halves together in the closed clamping position.

9. A lockable clamping apparatus as claimed in claim 8 wherein said lock is a padlock.

10. A clamping apparatus as claimed in claim 4 further comprising:
    pivoting handle means for pivotally moving said inner and outer clamping halves about the first pivot point between the open mounting position and the closed clamping position, said pivoting handle means including a generally longitudinally extending longer section and a generally longitudinally extending shorter section;
    said longer section having a handle at a distal end thereof and a forked section at a proximal end thereof with a central section located therebetween, said forked section including two corresponding projections defining a jaw therebetween;

said shorter section having a first end located at one end and a second end located at its other end, said first end being pivotally attached to said central section of said longer section for pivotal movement about a second pivot point, said second end of said shorter section being pivotally attached to said inner clamping half for pivotal movement about a third pivot point; and said outer clamping half having a depending support bracket located within said jaw of said forked section, said support bracket being pivotally attached to said corresponding projections of said forked section for pivotal movement about a fourth pivot point, the pivotal movement which occurs at said second, third and fourth pivot points serving to facilitate pivotal movement of said inner and outer clamping halves about said first pivot point.

11. A clamping apparatus as claimed in claim 4 further comprising said bicycle skewer.

12. A lockable clamping apparatus as claimed in claim 4 wherein said first clamping portion includes a resilient gripping means for tightly gripping said L-shaped member without marring the inner facing surfaces of the L-shaped member.

13. A lockable clamping apparatus as claimed in claim 12 wherein said resilient gripping means includes a first gripping portion for tightly gripping the inner facing surface of the base section and a second gripping portion for tightly gripping the inner facing surface of the side section.

14. A lockable clamping apparatus as claimed in claim 5 wherein said adjusting means includes a threaded bolt having a first end and a second end, said first clamping portion being mounted on said first end of said threaded bolt, said second end of said threaded bolt being threadably received in a threaded bore of a first end of a support arm of said inner clamping half, the threaded engagement of said bolt and bore enabling the position of said first clamping portion to be adjusted so that said apparatus can tightly engage a variety of differently sized L-shaped members, the position of said first clamping portion being adjusted by threading said threaded bolt within said threaded bore until said bolt reaches a position that enables said first and second clamping portions to tightly engage the L-shaped member.

15. An apparatus as claimed in claim 14 wherein said adjusting means further includes a nut for threading onto said second end of said threaded bolt to tightly secure the position of said bolt with respect to said support arm, said nut securing said bolt when said nut is tightened up against said first end of said support arm.

16. A lockable clamping apparatus as claimed in claim 4 wherein said skewer mounting means is rigidly attached to said outer clamping half.

17. A clamping apparatus as claimed in claim 16 wherein said skewer mounting means includes a spacing tower for spacing a bicycle skewer a predetermined distance from said outer clamping half.

18. A lockable clamping apparatus as claimed in claim 4 wherein said second clamping portion includes an L-shaped portion for engaging the outer facing surfaces of the L-shaped member.

19. A lockable clamping apparatus as claimed in claim 18 wherein said outer clamping half includes a support plate which projects outwardly from an edge of said L-shaped portion, said outer clamping half also including a depending support bracket having a first and second end, said first end of said support bracket being rigidly attached to an underside surface of said support plate, said second end of said support bracket being pivotally connected to said inner clamping half.

20. A lockable clamping apparatus as claimed in claim 19 wherein said lock facilitating means includes a bore extending through said depending support bracket, said bore being sized to slidably receive the U-shaped portion of a padlock, said bore also being positioned on said support bracket so that said inner and outer clamping halves will be locked together in the closed clamping position when U-shaped bore and locked to said padlock.

* * * * *